United States Patent [19]

Yamada et al.

[11] Patent Number: 5,884,063
[45] Date of Patent: Mar. 16, 1999

[54] METHOD OF AND APPARATUS FOR PRODUCING MOVING IMAGE COMPOSED OF RANDOM DOTS

[75] Inventors: Teruhiro Yamada, Katano; Satoshi Takemoto, Hirokata; Takashi Ikeda, Higashiosaka, all of Japan; Toshio Obase, Cupertino, Calif.

[73] Assignee: Sanyo Electric Co., Ltd., Osaka, Japan

[21] Appl. No.: 932,608

[22] Filed: Sep. 17, 1997

[30] Foreign Application Priority Data

Sep. 20, 1996 [JP] Japan ................................. 8-250448

[51] Int. Cl.⁶ .................................................. G06F 15/00
[52] U.S. Cl. ................................................... 345/475
[58] Field of Search ................................ 345/473, 474, 345/475, 118, 121

[56] References Cited

U.S. PATENT DOCUMENTS 5,214,758  5/1993  Ohba et al. .............................. 395/164
5,699,499  12/1997  Kawada et al. ......................... 395/175

*Primary Examiner*—Phu K. Nguyen
*Attorney, Agent, or Firm*—Nikaido, Marmelstein, Murray & Oram LLP

[57] ABSTRACT

A plurality of types of random dot pattern images each represented by data composed of a predetermined number of bits, one of which is one and the others of which are zero, and differing in the position of the bit which is one are overlapped, to produce one overlap image. A plurality of types of translation tables for obtaining an output image from the overlap image are successively switched, to successively output a plurality of types of images respectively corresponding to said random dot pattern images.

6 Claims, 18 Drawing Sheets

LEFT EYE IMAGE 41L 52L  53L

RIGHT EYE IMAGE 41R 52R  53R

FIG. 3

| 255 | 254 | 253 | 252 | 251 | 250 | 249 | 248 | 247 | 246 | 245 | 244 | 243 | 242 | 241 | 240 |
|---|---|---|---|---|---|---|---|---|---|---|---|---|---|---|---|
| 239 | 238 | 237 | 236 | 235 | 234 | 233 | 232 | 231 | 230 | 229 | 228 | 227 | 226 | 225 | 224 |
| 223 | 222 | 221 | 220 | 219 | 218 | 217 | 216 | 215 | 214 | 213 | 212 | 211 | 210 | 209 | 208 |
| 207 | 206 | 205 | 204 | 203 | 202 | 201 | 200 | 199 | 198 | 197 | 196 | 195 | 194 | 193 | 192 |
| 191 | 190 | 189 | 188 | 187 | 186 | 185 | 184 | 183 | 182 | 181 | 180 | 179 | 178 | 177 | 176 |
| 175 | 174 | 173 | 172 | 171 | 170 | 169 | 168 | 167 | 166 | 165 | 164 | 163 | 162 | 161 | 160 |
| 159 | 158 | 157 | 156 | 155 | 154 | 153 | 152 | 151 | 150 | 149 | 148 | 147 | 146 | 145 | 144 |
| 143 | 142 | 141 | 140 | 139 | 138 | 137 | 136 | 135 | 134 | 133 | 132 | 131 | 130 | 129 | 128 |
| 127 | 126 | 125 | 124 | 123 | 122 | 121 | 120 | 119 | 118 | 117 | 116 | 115 | 114 | 113 | 112 |
| 111 | 110 | 109 | 108 | 107 | 106 | 105 | 104 | 103 | 102 | 101 | 100 | 99 | 98 | 97 | 96 |
| 95 | 94 | 93 | 92 | 91 | 90 | 89 | 88 | 87 | 86 | 85 | 84 | 83 | 82 | 81 | 80 |
| 79 | 78 | 77 | 76 | 75 | 74 | 73 | 72 | 71 | 70 | 69 | 68 | 67 | 66 | 65 | 64 |
| 63 | 62 | 61 | 60 | 59 | 58 | 57 | 56 | 55 | 54 | 53 | 52 | 51 | 50 | 49 | 48 |
| 47 | 46 | 45 | 44 | 43 | 42 | 41 | 40 | 39 | 38 | 37 | 36 | 35 | 34 | 33 | 32 |
| 31 | 30 | 29 | 28 | 27 | 26 | 25 | 24 | 23 | 22 | 21 | 20 | 19 | 18 | 17 | 16 |
| 15 | 14 | 13 | 12 | 11 | 10 | 9 | 8 | 7 | 6 | 5 | 4 | 3 | 2 | 1 | 0 |

| 255 | 255 | 255 | 255 | 255 | 255 | 255 | 255 | 255 | 255 | 255 | 255 | 255 | 255 | 255 | 255 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 5

|  |  |  |  |  |  |  |  |  |  |  |  |  |  |  | Q 2 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 6

|  |  |  |  |  |  |  |  |  |  |  |  |  |  |  | Q 3 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 7

| | | | | | | | | | | | | | | | Q4 |
|---|---|---|---|---|---|---|---|---|---|---|---|---|---|---|---|
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 | 0 |

FIG. 8

| | | | | | | | | | | | | | | | Q5 |
|---|---|---|---|---|---|---|---|---|---|---|---|---|---|---|---|
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |
| 255 | 255 | 255 | 255 | 255 | 255 | 255 | 255 | 0 | 0 | 0 | 0 | 0 | 0 | 0 | 0 |

| 255 | 255 | 255 | 255 | 0 | 0 | 0 | 0 | 255 | 255 | 255 | 255 | 0 | 0 | 0 | 0 |
|---|---|---|---|---|---|---|---|---|---|---|---|---|---|---|---|
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |
| 255 | 255 | 255 | 255 | 0 | 0 | 0 | 0 | 255 | 255 | 255 | 255 | 0 | 0 | 0 | 0 |

| 255 | 255 | 0 | 0 | 255 | 255 | 0 | 0 | 255 | 255 | 0 | 0 | 255 | 255 | 0 | 0 |
|---|---|---|---|---|---|---|---|---|---|---|---|---|---|---|---|
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |
| 255 | 255 | 0 | 0 | 255 | 255 | 0 | 0 | 255 | 255 | 0 | 0 | 255 | 255 | 0 | 0 |

FIG. 11

| | | | | | | | | | | | | | | | Q 8 |
|---|---|---|---|---|---|---|---|---|---|---|---|---|---|---|---|
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |
| 255 | 0 | 255 | 0 | 255 | 0 | 255 | 0 | 255 | 0 | 255 | 0 | 255 | 0 | 255 | 0 |

FIG. 20
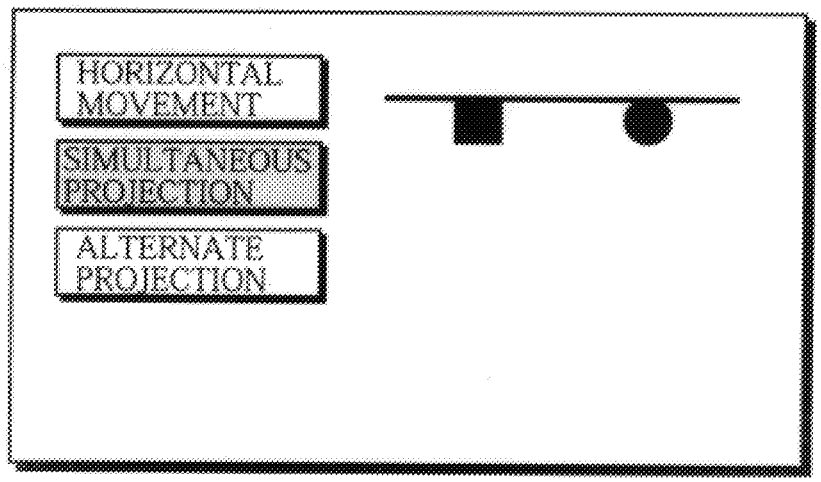
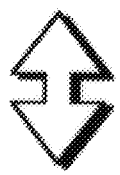
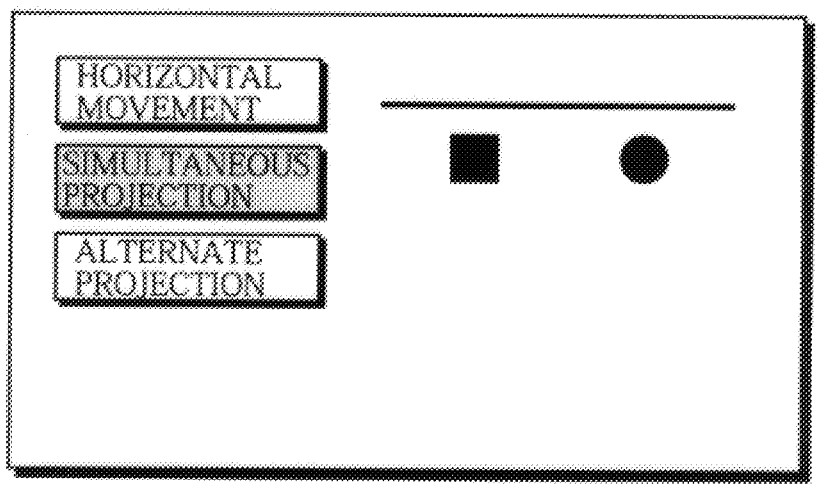

FIG. 21
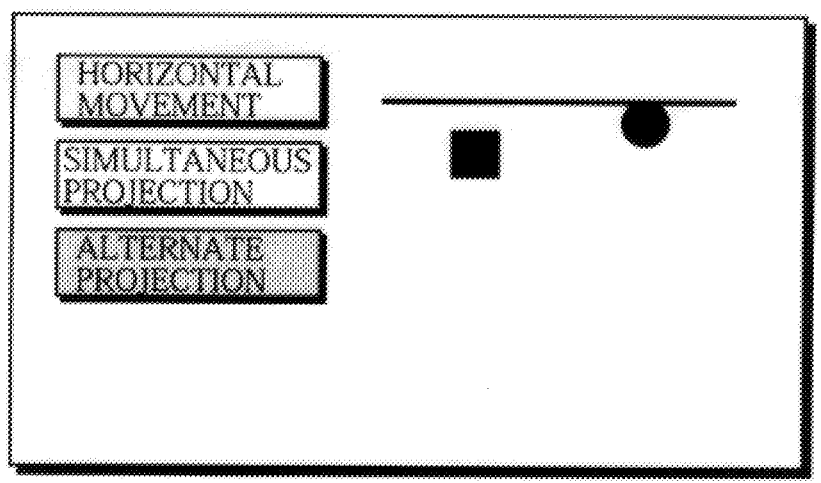
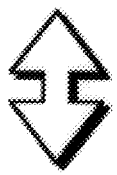
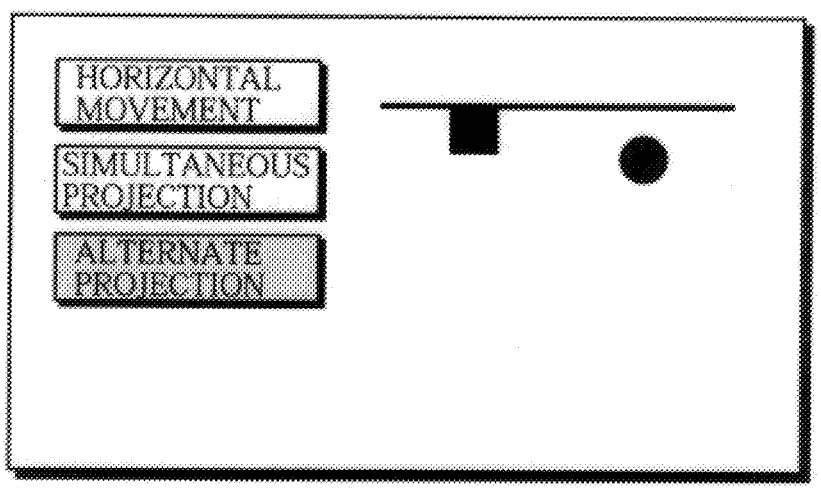

METHOD OF AND APPARATUS FOR PRODUCING MOVING IMAGE COMPOSED OF RANDOM DOTS

BACKGROUND OF THE INVENTION

1. Field of the Invention

The present invention relates to a method of and an apparatus for producing a moving image composed of random dots.

2. Description of the Prior Art

In order to display a moving image composed of random dots, a plurality of different random dot patterns are previously stored in a storage device. For example, eight types of different random dot patterns are previously stored in a storage device. The random dot patterns are successively transferred to a frame memory at predetermined time intervals, and are displayed on a display. Consequently, a moving image which looks as if random dots composing the moving image were moving is obtained.

Although each of the random dots can be represented by one bit, each of the random dots is generally represented by not less than eight bits because of limitations of hardware such as a personal computer. In a conventional method of successively transferring the respective types of random dot patterns to a frame memory, therefore, it takes long to switch the random dot patterns.

SUMMARY OF THE INVENTION

An object of the present invention is to provide a method of and an apparatus for producing a moving image composed of random dots, in which time required to switch random dot patterns can be shortened.

In a method of producing a moving image composed of random dots, in which a plurality of types of random dot pattern images are displayed upon being switched for each predetermined time period, one of pixels constituting each of the random dot pattern images being represented by a plurality of bits, a method of producing a moving image composed of random dots according to the present invention is characterized by comprising the steps of overlapping a plurality of types of random dot pattern images each represented by data composed of a predetermined number of bits, one of which is one and the others of which are zero, and differing in the position of the bit which is one, to produce one overlap image, and successively outputting a plurality of types of images respectively corresponding to the random dot pattern images by successively switching a plurality of types of translation tables for obtaining an output image from the overlap image.

Examples of each of the translation tables include one outputting, only when one bit determined for the translation table out of bits composing one of pixels constituting the overlap image is one, data corresponding to one.

In an apparatus for producing a moving image composed of random dots, in which a plurality of types of random dot pattern images are displayed upon being switched for each predetermined time period, one of pixels constituting each of the random dot pattern images being represented by a plurality of bits, an apparatus for producing a moving image composed of random dots according to the present invention is characterized by comprising means for storing in a frame memory one overlap image obtained by overlapping a plurality of types of random dot pattern images each represented by data composed of a predetermined number of bits, one of which is one and the others of which are zero, and differing in the position of the bit which is one, and means for successively outputting a plurality of types of images respectively corresponding to the random dot pattern images by successively switching a plurality of types of translation tables for obtaining an output image from the overlap image stored in the frame memory.

Examples of each of the translation tables include one outputting, only when one bit determined for the translation table out of bits composing one of pixels constituting the overlap image is one, data corresponding to one.

A computer readable recording medium on which a program for displaying a plurality of types of random dot pattern images upon switching the random dot pattern images for each predetermined time period, one of pixels constituting each of the random dot pattern images being represented by a plurality of bits, is recorded, which is characterized in that the program causes a computer to carry out the steps of storing in a frame memory one overlap image obtained by overlapping a plurality of types of random dot pattern images each represented by data composed of a predetermined number of bits, one of which is one and the others of which are zero, and differing in the position of the bit which is one, and means for successively outputting a plurality of types of images respectively corresponding to the random dot pattern images by successively switching a plurality of types of translation tables for obtaining an output image from the overlap image stored in the frame memory.

Examples of each of the translation tables include one outputting, only when one bit determined for the translation table out of bits composing one of pixels constituting the overlap image is one, data corresponding to one.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table showing input data "1" to "255";

FIG. 4 is a table showing output data outputted from a first color pallet Q1 with respect to input data in respective positions shown in FIG. 3;

FIG. 5 is a table showing output data outputted from a second color pallet Q2 with respect to input data in respective positions shown in FIG. 3;

FIG. 6 is a table showing output data outputted from a third color pallet Q3 with respect to input data in respective positions shown in FIG. 3;

FIG. 7 is a table showing output data outputted from a fourth color pallet with respect to input data in respective positions shown in FIG. 3;

FIG. 8 is a table showing output data outputted from a fifth color pallet Q5 with respect to input data in respective positions shown in FIG. 3;

FIG. 9 is a table showing output data outputted from a sixth color pallet Q6 with respect to input data in respective positions shown in FIG. 3;

FIG. 10 is a table showing output data outputted from a seventh color pallet Q7 with respect to input data in respective positions shown in FIG. 3;

FIG. 11 is a table showing output data outputted from an eighth color pallet Q8 with respect to input data in respective positions shown in FIG. 3;

FIG. 20 is a schematic view showing a display screen of a 2D display in a case where a button for selecting simultaneous projection is pushed on the basis of a sub-menu for a random dot test;

FIG. 21 is a schematic view showing a display screen of a 2D display in a case where a button for selecting alternate projection is pushed on the basis of a sub-menu for a random dot test.

DETAILED DESCRIPTION OF THE PREFERRED EMBODIMENTS

Figure 1:
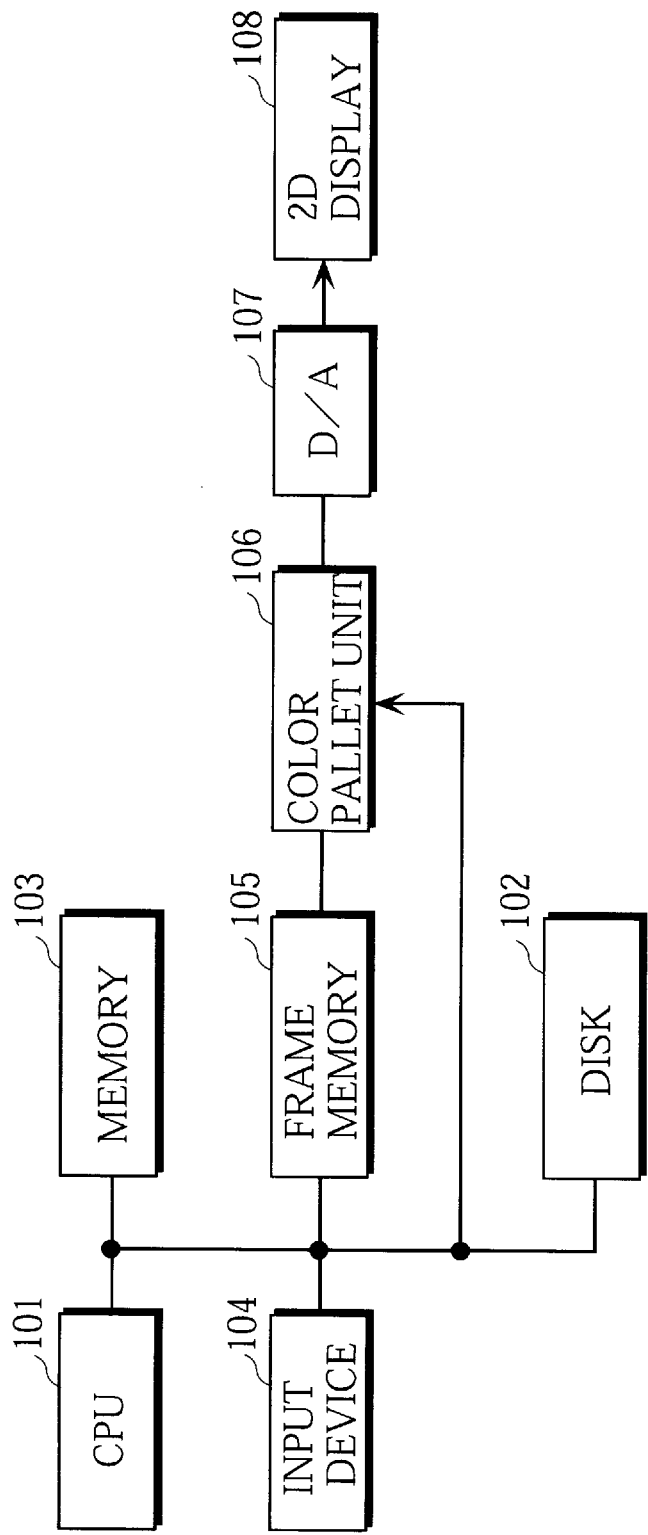
FIG. 1 illustrates the construction of a display device for displaying a moving image composed of random dots.

Referring to the drawings, embodiments of the present invention will be described.

[1] Description of First Embodiment

FIG. 1 illustrates the construction of a display device for displaying a moving image composed of random dots.

The display device is controlled by a CPU 101. Connected to the CPU 101 are a hard disk 102 storing its program and the like and a memory 103 storing necessary data. Further, an input device 104 is connected to the CPU 101.

Furthermore, a frame memory 105 is connected to the CPU 101. The frame memory 105 is connected to a two-dimensional (2D) display 108 through a color pallet unit 106 and a digital-to-analog (D/A) converter 107.

Figure 2:
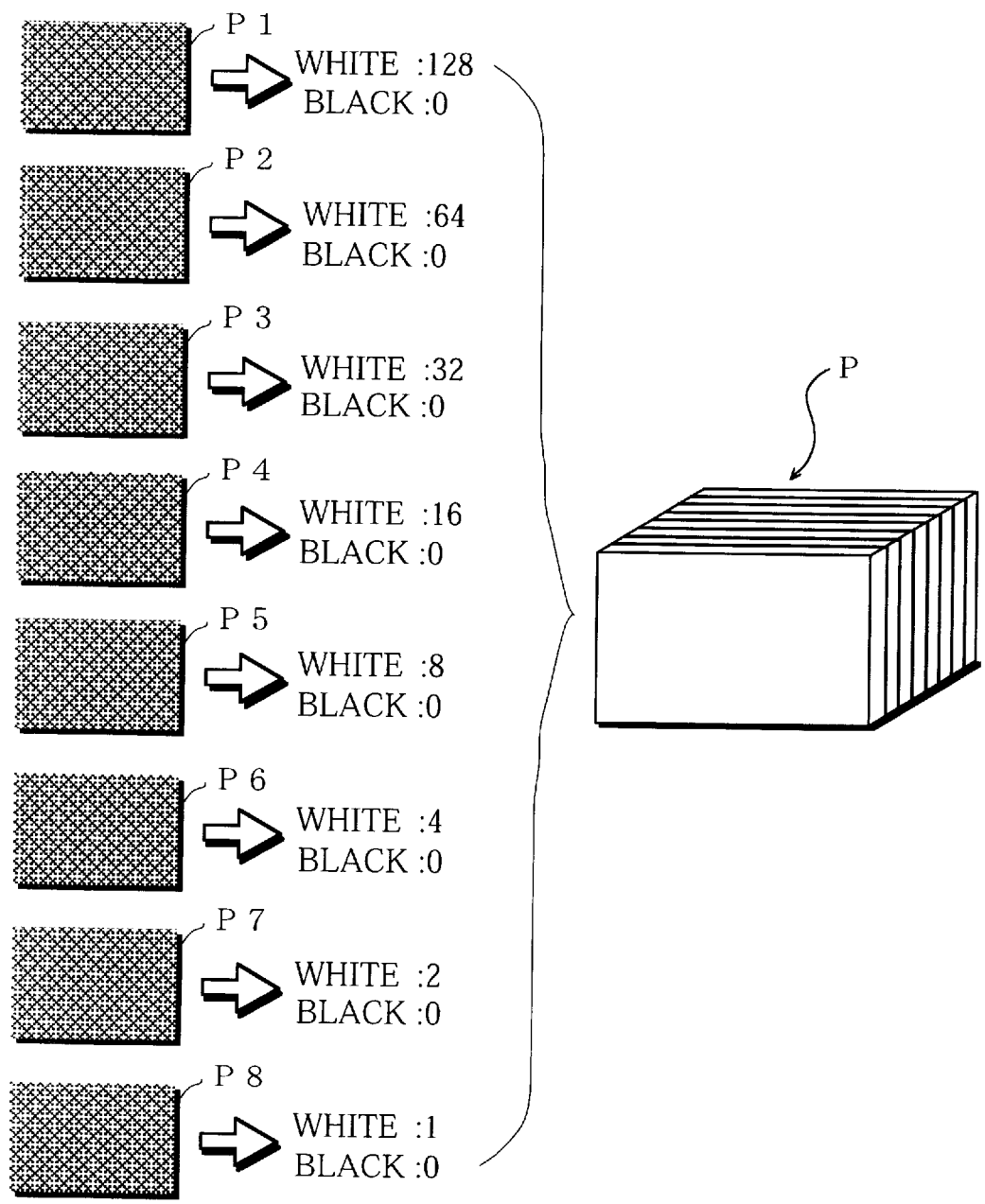
FIG. 2 is a schematic view showing eight different random dot patterns which form the basis of the production of an overlap image.

One image obtained by overlapping eight types of different random dot patterns (a first pattern P1 to an eighth pattern P8) (hereinafter referred to as an overlap image P) is stored, as shown in FIG. 2, in the hard disk 102.

The overlap image P is produced in the following manner. The respective random dot patterns P1 to P8 are first produced. The dimensions of each of the random dot patterns are 480 pixels in length by 640 pixels in breath. Further, each of dots composing each of the random dot patterns is represented by eight bits. That is, data representing a black dot is "0" [00000000], and data representing a white dot is "255" [11111111]. A numeral put in brackets represents a 8-bit binary digit.

Data representing each of white dots composing the first pattern P1 is converted into "128" [10000000]. Data representing each of white dots composing the second pattern P2 is converted into "64" [01000000]. Data representing each of white dots composing the third pattern P3 is converted into "32" [00100000]. Data representing each of white dots composing the fourth pattern P4 is converted into "16" [00010000]. Data representing each of white dots composing the fifth pattern P5 is converted into "8" [00001000]. Data representing each of white dots composing the sixth pattern P6 is converted into "4" [00000100]. Data representing each of white dots composing the seventh pattern P7 is converted into "2" [00000010]. Data representing each of white dots composing the eighth pattern P8 is converted into "1" [00000001].

Eight types of patterns each obtained by converting the data representing the white dot are added, to produce an overlap image P. The overlap image P obtained is stored in the hard disk 102.

The position of a pixel is represented by (x, y). When data representing each of pixels constituting the first pattern P1, data representing each of pixels constituting the second pattern P2, data representing each of pixels constituting the third pattern P3, data representing each of pixels constituting the fourth pattern P4, data representing each of pixels constituting the fifth pattern P5, data representing each of pixels constituting the sixth pattern P6, data representing each of pixels constituting the seventh pattern P7, and data representing each of pixels constituting the eighth pattern P8 are respectively represented by P1(x, y), P2(x, y), P3(x, y), P4(x, y), P5(x, y), P6(x, y), P7(x, y), and P8(x, y), data P (x, y) representing each of pixels constituting the overlap image is expressed by the following equation (1):

$$\begin{aligned} P(x, y) = &\ P1(x, y) \div 255 \times 128 \\ &+ P2(x, y) \div 255 \times 64 \\ &+ P3(x, y) \div 255 \times 32 \\ &+ P4(x, y) \div 255 \times 16 \\ &+ P5(x, y) \div 255 \times 8 \\ &+ P6(x, y) \div 255 \times 4 \\ &+ P7(x, y) \div 255 \times 2 \\ &+ P8(x, y) \div 255 \times 1 \end{aligned} \quad \ldots (1)$$

First to eighth color pallets (translation tables) Q1 to Q8 are successively transferred by the CPU 101, as described later, to the color pallet unit 106.

FIG. 4 illustrates output data outputted from the first color pallet Q1 with respect to input data in each of positions shown in FIG. 3. The first color pallet Q1 outputs "0" [00000000] if the input data is "0" [00000000] to "127" [01111111], while outputting "255" [11111111] if the input data is "128" [10000000] to "255" [11111111]. That is, it outputs [00000000] if the most significant digit (the eighth bit) of the input data is [0], while outputting [11111111] if the most significant digit of the input data is [1]. When the overlap image P is inputted to the first color pallet Q1, therefore, the same data as data representing the first pattern P1 is outputted.

FIG. 5 illustrates output data outputted from the second color pallet Q2 with respect to the input data in each of the positions shown in FIG. 3. The second color pallet Q2 outputs "0" [00000000] if the input data is "0" [00000000] to "63" [00111111] or the input data is "128" [10000000] to "191" [10111111]. Further, it outputs "255" [11111111] when the input data is "64" [01000000] to "127" [01111111] or the input data is "192" [11000000] to "255" [11111111]. That is, it outputs [00000000] if the seventh bit of the input data is [0], while outputting [11111111] if the seventh bit of the input data is [1]. When the overlap image P is inputted to the second color pallet Q2, therefore, the same data as data representing the second pattern P2 is outputted.

FIG. 6 illustrates output data outputted from the third color pallet Q3 with respect to the input data in each of the positions shown in FIG. 3. The third color pallet Q3 outputs [00000000] if the sixth bit of the input data is [0], while outputting [11111111] if the sixth bit of the input data is [1]. When the overlap image P is inputted to the third color pallet Q3, therefore, the same data as data representing the third pattern P3 is outputted.

FIG. 7 illustrates output data outputted from the fourth color pallet Q4 with respect to the input data in each of the positions shown in FIG. 3. The fourth color pallet Q4 outputs [00000000] if the fifth bit of the input data is [0], while outputting [11111111] if the fifth bit of the input data is [1]. When the overlap image P is inputted to the fourth color pallet Q4, therefore, the same data as data representing the fourth pattern P4 is outputted.

FIG. 8 illustrates output data outputted from the fifth color pallet Q5 with respect to the input data in each of the positions shown in FIG. 3. The fifth color pallet Q5 outputs [00000000] if the fourth bit of the input data is [0], while outputting [11111111] if the fourth bit of the input data is [1]. When the overlap image P is inputted to the fifth color pallet Q5, therefore, the same data as data representing the fifth pattern P5 is outputted.

FIG. 9 illustrates output data outputted from the sixth color pallet Q6 with respect to the input data in each of the positions shown in FIG. 3. The sixth color pallet Q6 outputs [00000000] if the third bit of the input data is [0], while outputting [11111111] if the third bit of the input data is [1]. When the overlap image P is inputted to the sixth color pallet Q6, therefore, the same data as data representing the sixth pattern P6 is outputted.

FIG. 10 illustrates output data outputted from the seventh color pallet Q7 with respect to the input data in each of the positions shown in FIG. 3. The seventh color pallet Q7 outputs [00000000] if the second bit of the input data is [0], while outputting [11111111] if the second bit of the input data is [1]. When the overlap image P is inputted to the seventh color pallet Q7, therefore, the same data as data representing the seventh pattern P7 is outputted.

FIG. 11 illustrates output data outputted from the eighth color pallet Q8 with respect to the input data in each of the positions shown in FIG. 3. The eighth color pallet Q8 outputs [00000000] if the least significant digit (the first bit) of the input data is [0], while outputting [11111111] if the least significant digit of the input data is [1]. When the overlap image P is inputted to the eighth color pallet Q8, therefore, the same data as data representing the eighth pattern P8 is outputted.

Figure 12:
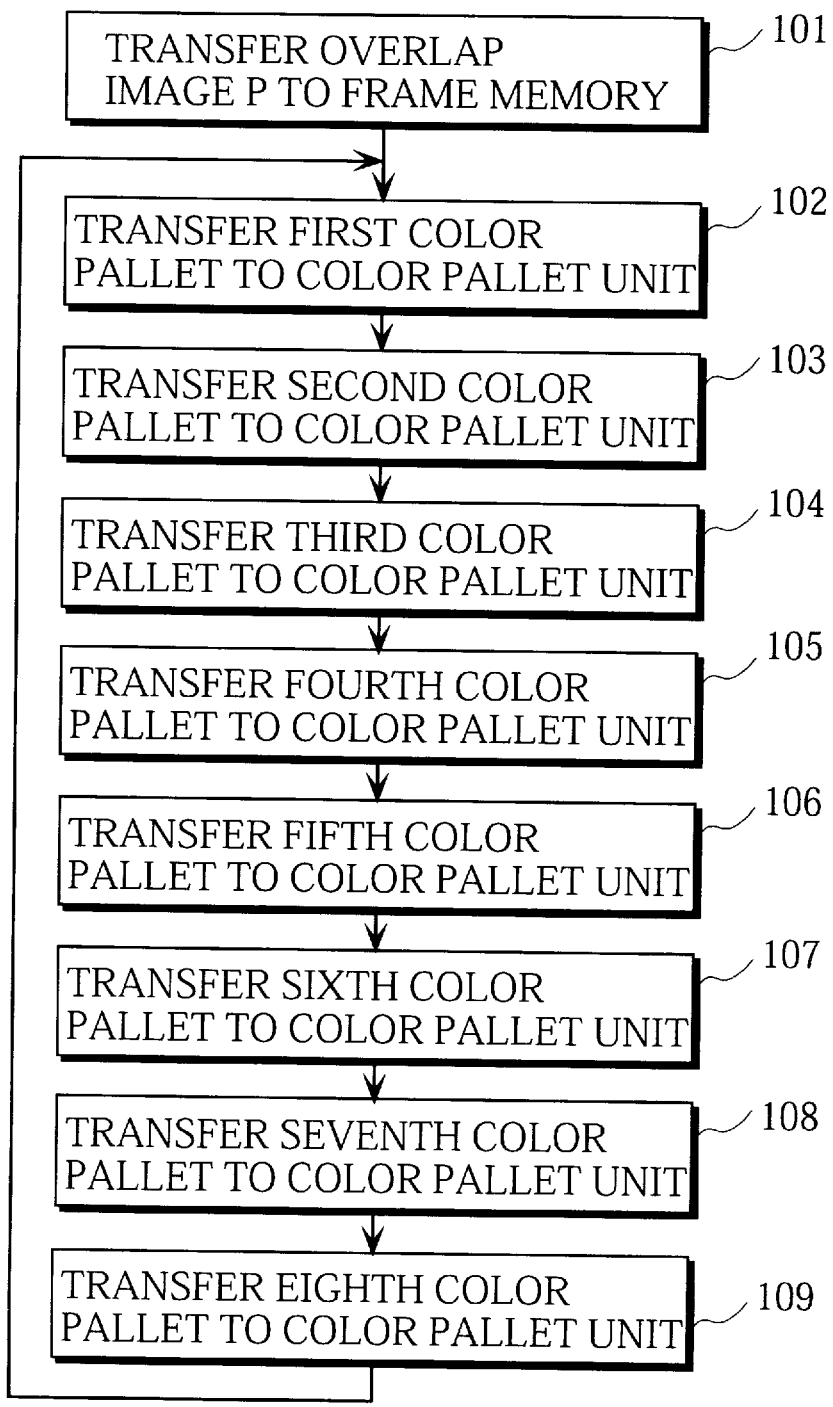
FIG. 12 is a flow chart showing the procedure for display processing of a moving image composed of random dots.

FIG. 12 shows the procedure for display processing of a moving image composed of random dots by the CPU 101. The overlap image P is first transferred to the frame memory 105 from the hard disk 102 (step 101).

The first color pallet Q1 is then transferred to the color pallet unit 106 (step 102). Consequently, the same data as data representing the first random dot pattern P1 is outputted from the color pallet unit 106 by the overlap image stored in the frame memory 105 and the first color pallet Q1, and is sent to the 2D display 108 through the D/A converter 107. Consequently, the same pattern as the first random dot pattern P1 is displayed.

The second color pallet Q2 is then transferred to the color pallet unit 106 (step 103). Consequently, the same data as data representing the second random dot pattern P2 is outputted from the color pallet unit 106 by the overlap image stored in the frame memory 105 and the second color pallet Q2, and is sent to the 2D display 108 through the D/A converter 107. Consequently, the same pattern as the second random dot pattern P2 is displayed.

The same patterns as the third to eighth random dot patterns P3 to P8 are successively displayed by successively switching the color pallets (steps 104 to 109). When the same pattern as the eighth random dot pattern P8 is displayed, the program is returned to the step 102. In the step 102, the first color pallet Q1 is transferred to the color pallet unit 106, so that the same pattern as the first random dot pattern P1 is displayed.

Specifically, the color pallets are successively switched by the CPU 101, so that the random dot patterns are displayed upon being switched at predetermined time intervals. In order to switch the random dot patterns displayed, the contents of the frame memory had to be conventionally rewritten. In the present embodiment, however, only the contents of the color pallet unit may be rewritten without rewriting the contents of the frame memory. That is, the amount of transferred data is reduced. Therefore, the random dot patterns can be displayed upon being switched at high speed. Further, the burden on the CPU 101 is reduced.

[2] Description of Second Embodiment

Description is now made of an embodiment in a case where the present invention is applied to a three-dimensional (3D) view inspecting apparatus.

Figure 13:
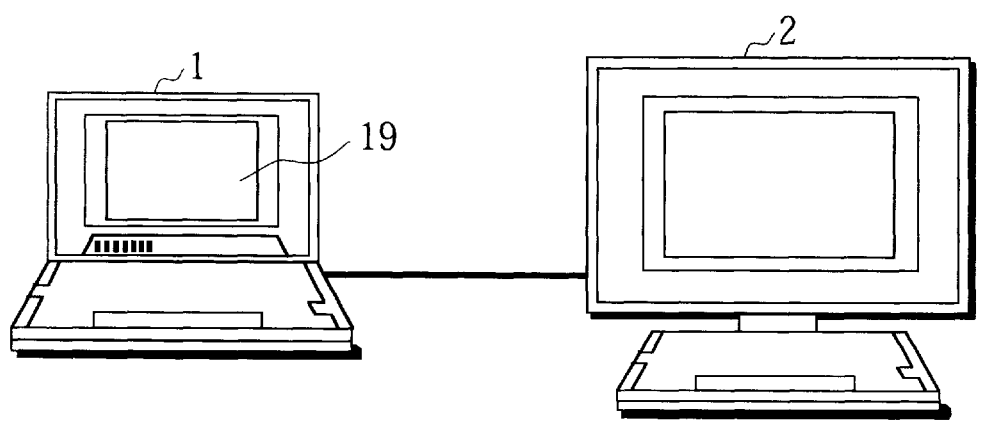
FIG. 13 is a diagram showing the appearance of a 3D view inspecting apparatus.

FIG. 13 illustrates the appearance of the 3D view inspecting apparatus.

The 3D view inspecting apparatus is constituted by a personal computer 1 operated by an inspecting person and a three-dimensional display device (3D display device) providing an image for 3D view inspection to a person to be inspected. As the personal computer 1, a so-called notebook-sized personal computer comprising a two-dimensional display (2D display) 19 is used in this example. An example of the 3D display device 2 is one of a parallax barrier type.

Figure 14:
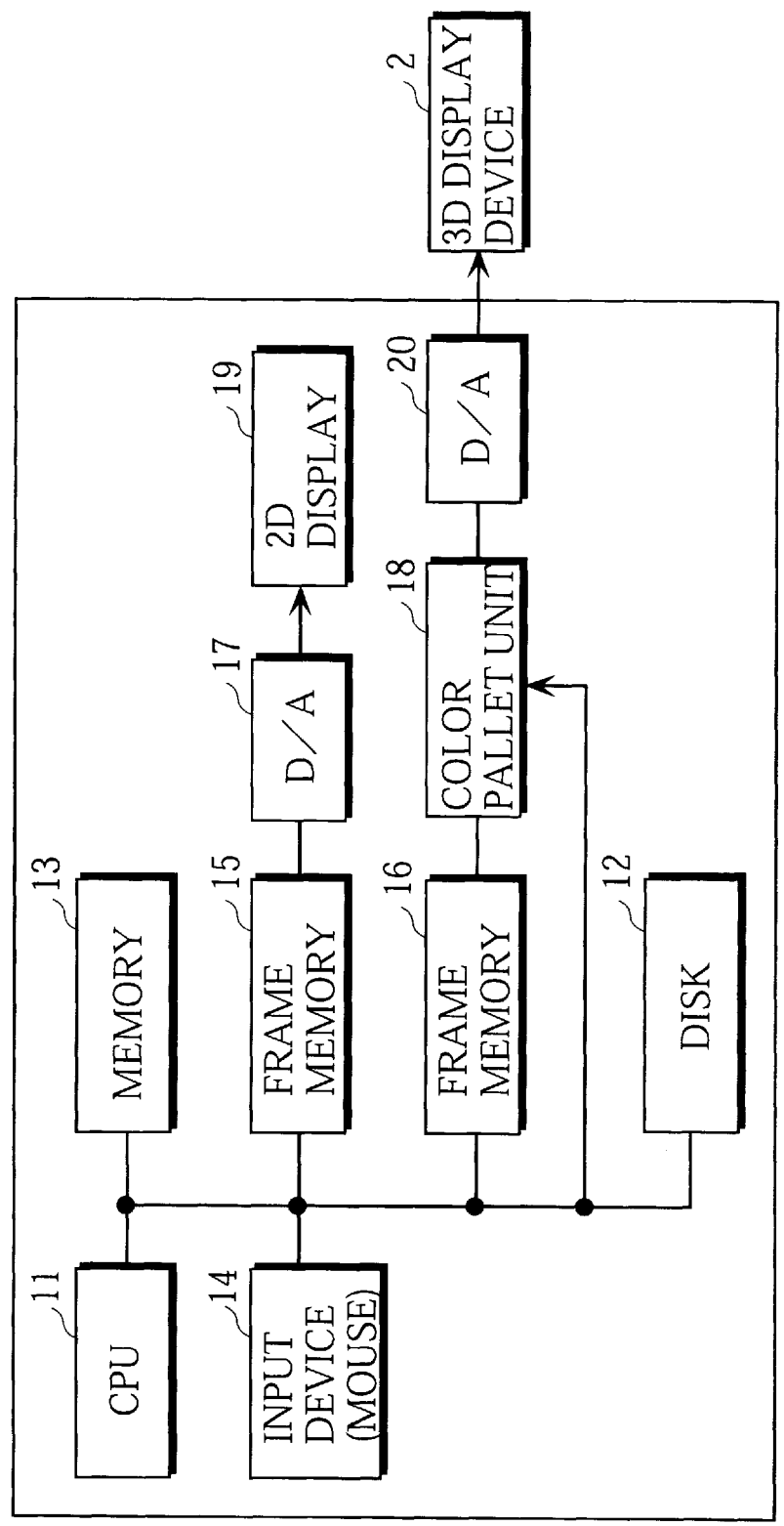
FIG. 14 is a block diagram showing the construction of a 3D view inspecting apparatus.

FIG. 14 illustrates the construction of the 3D view inspecting apparatus.

The personal computer 1 is controlled by a CPU 11. Connected to the CPU 11 are a hard disk 12 storing its program and the like and a memory 13 storing necessary data. Further, an input device 14 including a mouse is connected to the CPU 11.

Furthermore, a first frame memory 15 and a second frame memory 16 are connected to the CPU 11. The first frame memory 15 is connected to a 2D display 19 through a D/A converter 17. The second frame memory 16 is connected to a 3D display device 2 through a color pallet unit 18 and a D/A converter 20. First to eighth color pallets Q1 to Q8 are transferred by the CPU 11 to the color pallet unit 18, similarly to the color pallet unit 106 in the first embodiment.

Figure 15:
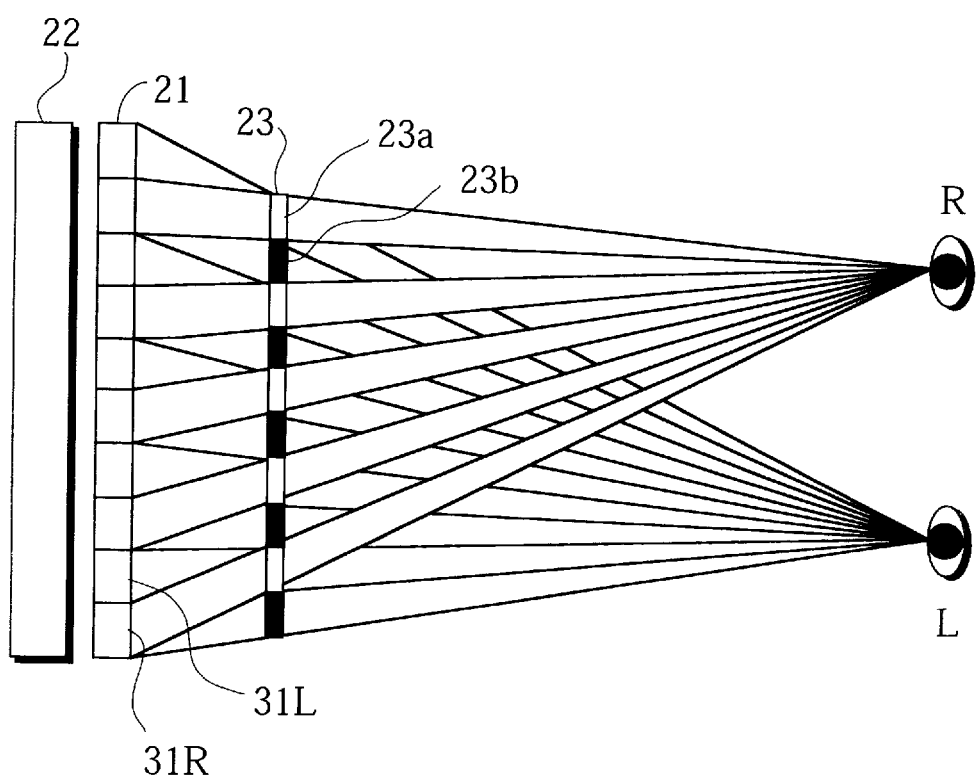
FIG. 15 is a schematic view showing the construction of a display section in a 3D display device.

FIG. 15 illustrates the construction of a display section in the 3D display device 2.

Figure 16:
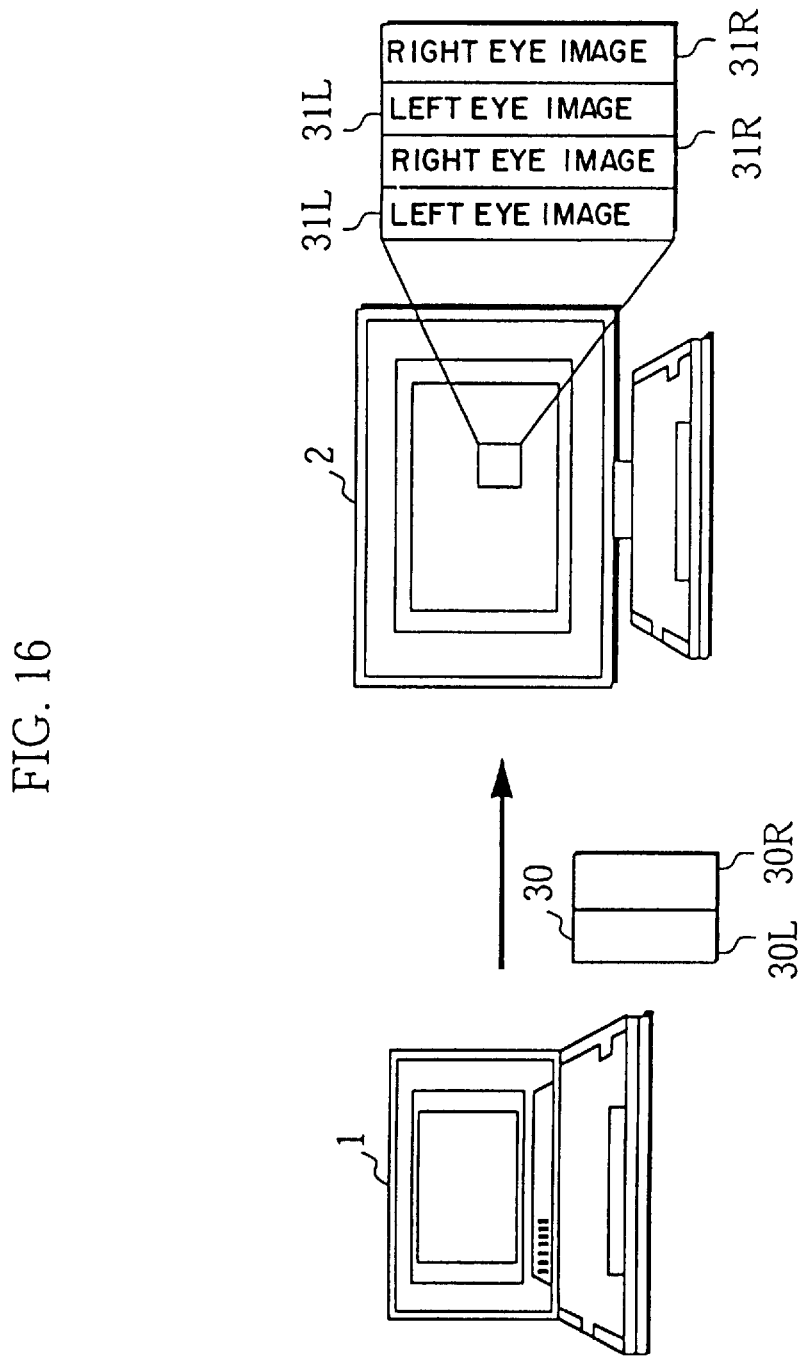
FIG. 16 is a schematic view showing an image fed to a 3D display device from a personal computer and an image displayed on the 3D display device.

Image information 30 comprising a left eye reduced image 30L obtained by reducing an original left eye image 30L to one-half in the horizontal direction and a right eye reduced image 30R obtained by reducing an original right eye image to one-half in the horizontal direction is sent to the 3D display device 2 from the personal computer 1, as shown in FIG. 16. The 3D display device 2 decomposes the left eye reduced image and the right eye reduced image which are sent into longwise strip-shaped images, alternately arranges the left eye strip-shaped images 31L and the right eye strip-shaped images 31R in the horizontal direction and displays the images on a liquid crystal panel 21, as shown in FIGS. 15 and 16.

As shown in FIG. 15, a back light 22 is disposed behind the liquid crystal panel 21. A parallax barrier 23 in which apertures 23a and barriers 23b are alternately arranged in the horizontal direction is disposed ahead of the liquid crystal panel 21. A person to be inspected views an image on the liquid crystal panel 21 through the parallax barrier 23, so that only the left eye strip-shaped images and only the right eye strip-shaped images are respectively seen with the left eye L and the right eye R of a person to be inspected.

Description is now made of a random dot test conducted by the 3D view inspecting apparatus.

In the random dot test, an image whose background is a random dot image is displayed. The image looks as if a square random dot image or a round random dot image constituting the image projected from the background, or the square random dot image projecting from the background was horizontally moving. Each of the background random dot image, the square random dot image and the round random dot image is a moving image which looks as if random dots composing the image were moving.

Figure 17:
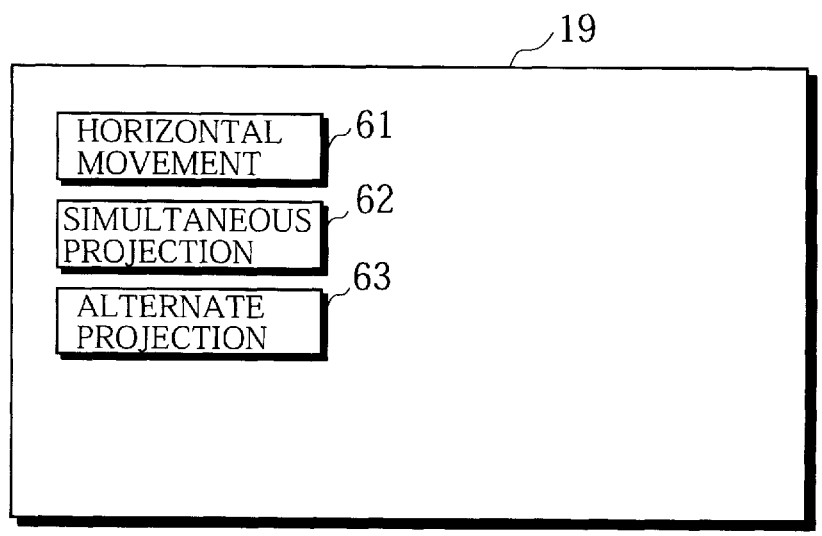
FIG. 17 is a schematic view showing one example of a menu screen displayed in a case where a random dot test is conducted.

FIG. 17 illustrates an example of a menu screen displayed in conducting the random dot test. In this example, a button 61 labeled "horizontal movement" for selecting such an image that a square random dot image constituting the image is horizontally moving, a button 62 labeled "simultaneous projection" for selecting such an image that a square random dot image and a round random dot image which constitute the image simultaneously project, a button 63 labeled "alternate projection" for selecting such an image that a square random dot image and a round random dot image which constitute the image alternately project, and the like are displayed on the 2D display 19.

In a state where the menu screen is displayed on the 2D display 19, when any one of the button 61, the button 62 and the button 63 is pushed, processing, which corresponds to the pushed button, of the random dot test is performed.

Description is made of processing of the test conducted when in a state where the menu screen is displayed on the 2D display 19, the button 62 for selecting simultaneous projection is pushed.

Description is first made of an image displayed on the 3D display device 2 in a case where the button 62 for selecting simultaneous projection is pushed.

When the button 62 for selecting simultaneous projection is pushed, an image whose background is a random dot image is displayed. The image looks as if a square random dot image and a round random dot image which constitute the image simultaneously projected or simultaneously retracted from the background.

In order to display such a moving image, different frame images must be successively displayed for each predetermined time period. The above-mentioned moving image shall be obtained by eight types of different frame images herein. Further, the square random dot image and the round random dot image are three-dimensional images, whereby each of the frame images is constituted by a left eye reduced image and a right eye reduced image.

An overlap image obtained by overlapping the eight types of frame images (hereinafter referred to as an overlap image for simultaneous projection) is stored in the hard disk 12. The overlap image is produced in the following manner.

Figure 18:
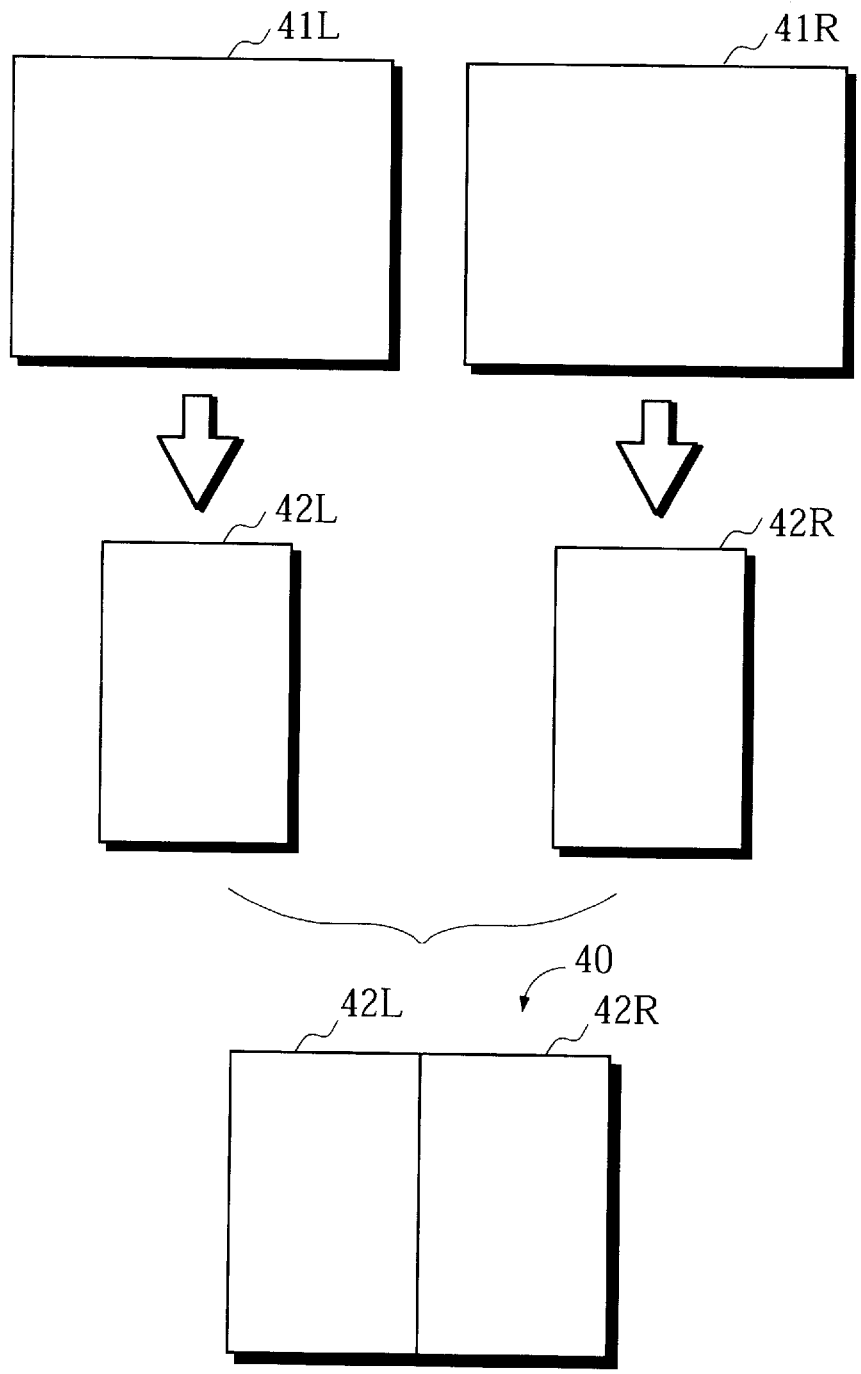
FIG. 18 is a schematic view showing frame images which form the basis of production of an overlap image for simultaneous projection.
Figure 19:
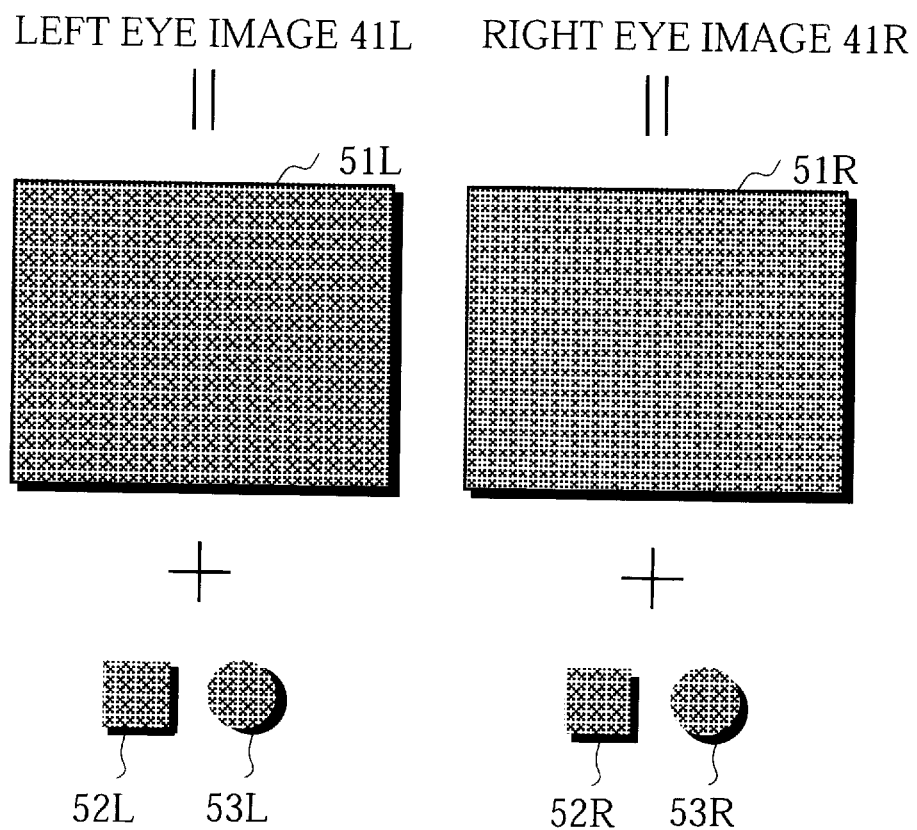
FIG. 19 is a schematic view showing a left eye image and a right eye image which form the basis of a frame image.

Each of the frame images 40 is an image corresponding to one frame which is constituted by images obtained by respectively reducing a left eye image 41L and a right eye image 41R in the horizontal direction, that is, a left eye reduced image 42L and a right eye reduced image 42R, as shown in FIG. 18. The left eye image 41L is an image obtained by synthesizing a square image 52L and a round image 53L in positions deviating rightward from the reference position and a background image 51L, and the right eye image 41R is an image obtained by synthesizing a square image 52R and a round image 53R in positions deviating leftward from the reference position and a background image 51R, as shown in FIG. 19. Synthesis means that data in a portion where the square image exists is data representing the square image, data in a portion where the round image exists is data representing the round image, and data in the other portion is data representing the background image.

In the same frame image, a random dot pattern constituting the background in the left eye image and a random dot pattern constituting the background in the right eye image are the same pattern. In the same frame image, a random dot pattern constituting the square image in the left eye image and a random dot pattern constituting the square image in the right eye image are the same pattern. Further, in the same frame image, a random dot pattern constituting the round image in the left eye image and a random dot pattern constituting the round image in the right eye image are the same pattern.

Between the different frame images, random dot patterns respectively constituting the backgrounds differ from each other. That is, in the eight frame images, the random dot patterns respectively constituting the backgrounds differ from each other. Between the different frame images, random dot patterns respectively constituting the square images differ from each other. That is, in the eight frame images, the random dot patterns respectively constituting the square images differ from each other. Further, between the different frame images, random dot patterns respectively constituting the round images differ from each other. That is, in the eight frame images, the random dot patterns respectively constituting the round images differ from each other.

If the square image and the round image are paid attention to, the amount of deviation in position in the horizontal direction between the left eye image and the right eye image is gradually increased in the eight frame images.

Since each of the eight frame images is composed of random dots, it comprises white dots and black dots. Data representing each of the white dots is "255", and data representing each of the black dots is "0". The data representing the white dots composing the eight frame images are converted for each frame image. Specifically, the data representing each of the white dots composing the first frame image is converted from "255" to "128", as in the first embodiment. The data representing each of the white dots composing the second frame image is converted from "255" to "64". The data representing each of the white dots composing the third frame image is converted from "255" to "32". The data representing each of the white dots composing the fourth frame image is converted from "255" to "16". The data representing each of the white dots composing the fifth frame image is converted from "255" to "8". The data representing each of the white dots composing the sixth frame image is converted from "255" to "4". The data representing each of the white dots composing the seventh frame image is converted from "255" to "2". The data representing each of the white dots composing the eighth frame image is converted from "255" to "1".

The eight frame images each obtained by thus converting the data representing the white dot are added, to produce an overlap image for simultaneous projection. The obtained overlap image for simultaneous projection is stored in the hard disk 12.

When the button 62 for selecting simultaneous projection is pushed, the overlap image for simultaneous projection is read out from the hard disk 12, and is transferred to the frame memory 16. The CPU 11 successively switches color pallets used in the color pallet unit 18 for each predetermined time period. In this case, the color pallets are successively switched in ascending order of numbers, for example, the first color pallet, the second color pallet, the third color pallet, . . . When the color pallets are switched to the eighth color pallet, the color pallets are successively switched in descending order of numbers, for example, the seventh color pallet, the sixth color pallet, . . . When the color pallets are switched to the first color pallet, the color pallets are successively switched again in ascending order of numbers.

When the first color pallet Q1 is selected, the same image as the first frame image is sent to the 3D display device 2 through the D/A converter 20. When the second color pallet Q2 is selected, the same image as the second frame image is sent to the 3D display device 2 through the D/A converter 20. When the third color pallet Q3 is selected, the same image as the third frame image is sent to the 3D display device 2 through the D/A converter 20. When the fourth color pallet Q4 is selected, the same image as the fourth frame image is sent to the 3D display device 2 through the D/A converter 20.

When the fifth color pallet Q5 is selected, the same image as the fifth frame image is sent to the 3D display device 2 through the D/A converter 20. When the sixth color pallet Q6 is selected, the same image as the sixth frame image is sent to the 3D display device 2 through the D/A converter 20. When the seventh color pallet Q7 is selected, the same image as the seventh frame image is sent to the 3D display device 2 through the D/A converter 20. When the eighth color pallet Q8 is selected, the same image as the eighth frame image is sent to the 3D display device 2 through the D/A converter 20.

The 3D display device 2 decomposes the left eye reduced image and the right eye reduced image which are sent into longwise strip-shaped images, alternately arranges the left eye strip-shaped images and the right eye strip-shaped images in the horizontal direction and displays the images on the liquid crystal panel 21. When a normal person to be inspected views an image displayed on the liquid crystal panel 21, therefore, the image looks as if a square random dot image and a round random dot image which constitute the image projected or retracted.

An inspecting person asks the person to be inspected whether or not an image projecting or retracting is seen.

Description is now made of an image displayed on the 2D display 19 in a case where the button 62 for selecting simultaneous projection is pushed.

When the button 62 for selecting simultaneous projection is pushed, the button 62 on the menu screen of the 2D display 19 is displayed upon being inverted, and a 2D image representing the movement of a 3D image displayed on the 3D display device 2 is displayed, as shown in FIG. 20.

Specifically, such a 2D moving image that the movements of a square image and a round image which constitute the image from its background are found on the basis of the amount of deviation in position in the horizontal direction between the left eye square image and the right eye square image and the amount of deviation in position in the horizontal direction between the left eye round image and the right eye round image is displayed on the 2D display 19.

Description is made of processing of the test in a case where the button 63 for selecting alternate projection is pushed in a state where the menu screen is displayed on the 2D display 19.

In this case, an image which looks as if a round image constituting the image retracted when a square image constituting the image projected, while projecting when it retracted is obtained on the 3D display device 2.

An overlap image for obtaining such an image (an overlap image for alternate projection) is previously produced, and is stored in the hard disk 12. In a method of producing the overlap image for alternate projection, the overlap image for alternate projection is produced from eight frame images, similarly to the overlap image for simultaneous projection. In the frame images which form the basis of the overlap image for simultaneous projection, the direction of the change in the amount of deviation between the right eye square image and the left eye square image and the direction of the change in the amount of deviation between the right eye round image and the left eye round image are the same. On the other hand, the frame images which form the basis of the overlap image for alternate projection, the direction of the change in the amount of deviation between the right eye square image and the left eye square image and the direction of the change in the amount of deviation between the right eye round image and the left eye round image are opposite to each other.

When the button 63 for selecting alternate projection is pushed, the overlap image for alternate projection is read out from the hard disk 12, and is transferred to the frame memory 16. The CPU 11 successively switches the color pallets used in the color pallet unit 18 for each predetermined time in the same manner as described above.

Display on the 2D display 19 in a case where the button 63 for selecting alternate projection is pushed is as follows. That is, as shown in FIG. 21, the button 63 on the menu screen of the 2D display 19 is displayed upon being inverted, and a 2D image representing the movement of a 3D image displayed on the 3D display device 2 is displayed.

Description is made of processing of the test in a case where the button 61 for selecting horizontal movement is pushed in a state where the menu screen is displayed on the 2D display 19.

When the button 61 for selecting horizontal movement is pushed, an image which looks as if a square random dot image constituting the image was horizontally moving in a state where it projected from its background (a random dot image) is obtained on the 3D display device 2.

An overlap image for obtaining such an image (an overlap image for horizontal movement) is previously produced, and is stored in the hard disk 12. In a method of producing the overlap image for horizontal movement, the overlap image for horizontal movement is produced from eight frame images, similarly to the overlap image for simultaneous projection. In the eight frame images which form the basis of the overlap image for horizontal movement, the amount of deviation between the right eye square image and the left eye square image is the same, while the position where the square image is displayed is gradually changed in the horizontal direction.

When the button 61 for selecting horizontal movement is pushed, the overlap image from horizontal movement is read out from the hard disk 12, and is transferred to the frame memory 16. The CPU 11 successively switches the color pallets used in the color pallet unit 18 for each predetermined time period in the same manner as described above.

When a normal person to be inspected views an image displayed on the liquid crystal panel 21, therefore, the image looks as if a square random dot image constituting the image was horizontally moving in a state where it projected from its background. An inspecting person asks the person to be inspected whether or not an image horizontally moving is seen.

Figure 22:
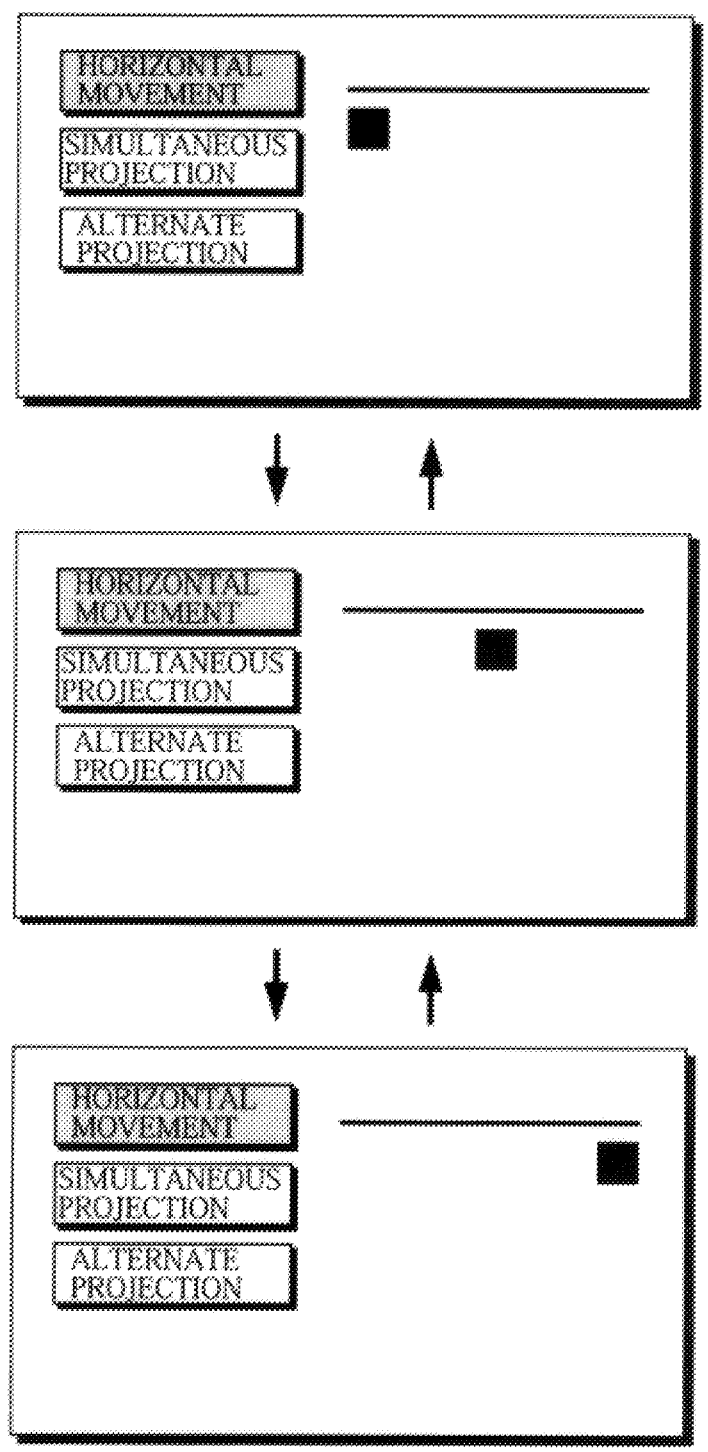
FIG. 22 is a schematic view showing a display screen of a 2D display in a case where a button for selecting horizontal movement is pushed on the basis of a sub-menu for a random dot test.

Display on the 2D display 19 in a case where the button 61 for selecting horizontal movement is pushed is as follows. That is, as shown in FIG. 22, the button 61 on the menu screen of the 2D display 19 is displayed upon being inverted, and a 2D image representing the movement of a 3D image displayed on the 3D display device 2 is displayed. Specifically, such a 2D moving image that the movement of a square image constituting the image projecting from its background is found on the basis of a 3D image (a left eye image and a right eye image) supplied to the 3D display device 2 is displayed on the 2D display 19.

In the inspection of the horizontal movement, the inspecting person can judge whether or not the person to be inspected recognizes the square image projecting from the background by comparing the movement of the eyes of the person to be inspected and the movement of the square image displayed on the 2D display 19.

In the random dot test, a background and a 3D view object (a square image and a round image) are taken as random dot images in order to prevent the 3D view object from being recognized when the image displayed on the 3D display device 2 is viewed only with one eye.

Dots composing the random dot images which are the background and the 3D view object (the square image and the round image) are moved in order to prevent the movement of the 3D view object from being recognized even when the 3D view object cannot be viewed in three dimensions in a case where the 3D view object is moved. This principle will be understood from such an example that when a mole moves in the ground of a sandbox, a moving path of the mole is found because the surface of the sandbox waves along the moving path, while the moving path is not found even if the mole moves under the ground of the sandbox if the entire sandbox waves.

Although the 3D display device of a parallax barrier type is used as a 3D display device, a 3D display device using no glasses such as a 3D display device of a lenticular type may be used. Further, as a 3D display device, a 3D display device using both polarizing glasses and liquid crystal shutter glasses may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a moving image composed of random dots, in which a plurality of types of random dot pattern images are displayed upon being switched the pixels constituting the random dot pattern images being represented by a plurality of bits, comprising the steps of:

overlapping a plurality of types of random dot pattern images each represented by data composed of a predetermined number of bits, one of which is one and the others of which are zero, and differing in the position of the bit which is one, to produce one overlap image; and successively outputting a plurality of types of images respectively corresponding to said random dot pattern images by successively switching a plurality of types of translation tables for obtaining an output image from said overlap image.

2. The method according to claim 1, wherein each of the translation tables outputs, only when one bit determined for the translation table of pixels constituting said overlap image is one, data corresponding to one.

3. An apparatus for producing a moving image composed of random dots, in which a plurality of types of random dot pattern images are displayed upon being switched the pixels constituting the random dot pattern images being represented by a plurality of bits, comprising:

means for storing in a frame memory one overlap image obtained by overlapping a plurality of types of random dot pattern images each represented by data composed of a predetermined number of bits, one of which is one and the others of which are zero, and differing in the position of the bit which is one; and means for successively outputting a plurality of types of images respectively corresponding to said random dot pattern images by successively switching a plurality of types of translation tables for obtaining an output image from said overlap image stored in the frame memory.

4. The apparatus according to claim 3, wherein each of the translation tables outputs, only when one bit determined for the translation table of pixels constituting the overlap image is one, data corresponding to one.

5. A computer readable recording medium on which a program for displaying a plurality of types of random dot pattern images upon switching the random dot pattern images the pixels constituting the random dot pattern images being represented by a plurality of bits, is recorded, said program causing a computer to carry out the steps of:

storing in a frame memory one overlap image obtained by overlapping a plurality of types of random dot pattern images each represented by data composed of a predetermined number of bits, one of which is one and the others of which are zero, and differing in the position of the bit which is one; and means for successively outputting a plurality of types of images respectively corresponding to said random dot pattern images by successively switching a plurality of types of translation tables for obtaining an output image from said overlap image stored in the frame memory.

6. The computer readable recording medium according to claim 5, wherein each of the translation tables outputs, only when one bit determined for the translation table of pixels constituting the overlap image is one, data corresponding to one.

* * * * *